United States Patent
Rein et al.

(10) Patent No.: US 11,051,907 B2
(45) Date of Patent: Jul. 6, 2021

(54) ADAPTER FOR CONNECTING A COMPRESSED GAS OPERATED DENTAL INSTRUMENT TO A COMPRESSOR

(71) Applicant: DENTSPLY SIRONA Inc., York, PA (US)

(72) Inventors: Matthias Rein, Lorsch (DE); Metin Ertugrul, Rodermark (DE); Ralf Sutter, Weinheim (DE)

(73) Assignee: DENTSPLY SIRONA Inc., York, PA (US)

( * ) Notice: Subject to any disclaimer, the term of this patent is extended or adjusted under 35 U.S.C. 154(b) by 0 days.

(21) Appl. No.: 14/963,863

(22) Filed: Dec. 9, 2015

(65) Prior Publication Data

US 2016/0157959 A1   Jun. 9, 2016

(30) Foreign Application Priority Data

Dec. 9, 2014   (DE) .................... 10 2014 225 324.1

(51) Int. Cl.
| | |
|---|---|
| *A61B 1/00* | (2006.01) |
| *A61C 1/05* | (2006.01) |
| *A61C 1/00* | (2006.01) |
| *A61C 1/08* | (2006.01) |
| *A61C 17/02* | (2006.01) |
| *A61C 17/022* | (2006.01) |

(Continued)

(52) U.S. Cl.
CPC ............ *A61C 1/052* (2013.01); *A61C 1/0015* (2013.01); *A61C 1/088* (2013.01); *A61C 17/022* (2013.01); *A61C 17/028* (2013.01); *A61C 17/0217* (2013.01); *A61G 15/14* (2013.01)

(58) Field of Classification Search
CPC ....... A61C 1/052; A61C 1/0015; A61C 1/088; A61C 17/0217; A61C 17/022; A61C 17/028; A61C 1/0007; A61C 1/0038; A61G 15/14; A61B 17/1624; A61B 17/1626

See application file for complete search history.

(56) References Cited

U.S. PATENT DOCUMENTS 5,006,067 A * 4/1991 Pignattini ............ A61C 1/0038
                                                                  222/571
5,567,154 A    10/1996 Wohlgemuth
(Continued)

FOREIGN PATENT DOCUMENTS

DE           19714167 A1   10/1998
DE   10 2012 212 483 A1    1/2014
(Continued)

OTHER PUBLICATIONS

Office Action issued in German Patent Application No. 10 2014 225 324.1, dated Aug. 14, 2015.

*Primary Examiner* — Heidi M Eide
(74) *Attorney, Agent, or Firm* — Dentsply Sirona Inc.

(57) ABSTRACT

The invention relates to an adapter for connecting a dental instrument to be operated with compressed gas to a compressor supplying the compressed gas, and to a control unit as well as a treatment unit comprising the adapter, wherein the adapter has at least one first input for the compressed gas of a compressor, a second input for a control signal, an output for connecting to the dental instrument, and a valve between the first input and output that is controllable by the control signal.

14 Claims, 2 Drawing Sheets

(51) Int. Cl.
*A61C 17/028* (2006.01)
*A61G 15/14* (2006.01)

(56) References Cited

U.S. PATENT DOCUMENTS

| | | | |
|---|---|---|---|
| 6,159,007 A * | 12/2000 | Sorensen | A61C 1/0076 |
| | | | 210/321.64 |
| 6,906,466 B2 * | 6/2005 | Feng | B23B 45/04 |
| | | | 315/55 |
| 6,997,883 B1 | 2/2006 | Hahn | |
| 2002/0117849 A1 * | 8/2002 | Bailey | A61C 1/18 |
| | | | 285/123.15 |
| 2007/0203439 A1 * | 8/2007 | Boyd | A61C 1/0084 |
| | | | 601/162 |
| 2008/0003537 A1 * | 1/2008 | Papanek | A61C 1/18 |
| | | | 433/126 |
| 2008/0145817 A1 | 6/2008 | Brennan et al. | |
| 2008/0220391 A1 * | 9/2008 | Temple | A61G 5/12 |
| | | | 433/101 |
| 2009/0226856 A1 * | 9/2009 | Sauter | A61B 17/1626 |
| | | | 433/141 |
| 2014/0120496 A1 * | 5/2014 | Rothenwaender | A61C 1/05 |
| | | | 433/132 |
| 2015/0173851 A1 | 6/2015 | Rein et al. | |
| 2015/0223910 A1 * | 8/2015 | Pruckner | A61C 1/088 |
| | | | 433/27 |

FOREIGN PATENT DOCUMENTS

| | | |
|---|---|---|
| EP | 0 696 443 A2 | 2/1996 |
| EP | 2727552 A1 | 5/2014 |

* cited by examiner

ADAPTER FOR CONNECTING A COMPRESSED GAS OPERATED DENTAL INSTRUMENT TO A COMPRESSOR

TECHNICAL FIELD

The invention relates to an adapter for connecting a dental instrument operated by compressed gas to a compressor and to a control unit, as well as a dental treatment unit comprising such an adapter.

PRIOR ART

In known dentists' preparation instruments having a turbine drive, also known as dental turbines, compressed air is used to drive a rotor. The kinetic energy of the air causes an impulse on the blades of the rotor through an exchange of momentum.

The performance of a dental turbine can be enhanced by increasing the pressure of the driven air. If the dental turbine is supplied directly by a dental treatment unit, the pressure and flow are, however, generally limited. In order to operate the dental turbine with greater pressure, it can, for example, be connected to a compressor as is known from US 2008/0145817 A1. The pressure is regulated according to US 2008/0145817 A1 depending on the continuously measured turbine rotational speed. The described control loop is required since the rotational speed of the dental turbine also rises as the pressure increases, and excessive rotational speeds should or must be prevented since they can lead to significantly faster turbine failures. Due to this involved regulation, the retrofitting of treatment units for operating the digital turbine with a compressor is involved and expensive.

Another way to limit the rotational speed of a dental turbine is, for example, known from DE 10 2012 212 483 A1, which describes a dental preparation instrument that has a disruptive contour arranged within the turbine chamber. A dental turbine drive with means for independently regulating the rotational speed is also known from EP 0 696 443.

The object of the present invention is to provide a very easy and economical version for retrofitting or operating a dental turbine of a dental treatment unit with the highest possible pressure.

DESCRIPTION OF THE INVENTION

The subject of the invention is an adapter for connecting a dental instrument to be operated with compressed gas to a compressor supplying the compressed gas, and to a control unit, wherein the adapter has at least one first input for the compressed gas of a compressor, a second input for a control signal of the control unit, an output for connecting to the dental instrument, and a valve between the first input and output that is controllable by the control signal.

Dental instruments to be operated with compressed gas are, for example, dental turbines, air scalers or pneumatic motors, such as in combination with handpieces or contra-angle handpieces. Such instruments are transmitting instruments by means of which a rotational force is transmitted to a tool such as a drill. The rotational force is generated by a rotor driven by compressed gas.

The adapter according to the invention makes it possible to retrofit a treatment unit in an easy and economical manner with a dental instrument that can be operated by a compressor, i.e., at a relatively high pressure, for example with a dental instrument having an internal torque brake. A compressed gas feedline can be connected for this purpose to the first input of the adapter directly from the compressor, such as a dental compressor, and the input for this purpose can be designed corresponding to the known standard as a compressor connection, such as a plug-in nipple. Furthermore, a feedline can be connected to the second input for a control signal for the valve of the adapter to control an outgoing compressed gas flow. The second input can be designed for this purpose, for example, according to the known standard in order to transmit control signals from a dental treatment unit to a dental instrument, such as a 2, 3, 4 or 6-hole connection according to the standard ISO 9168. A supply feedline of the dental instrument can be connected directly to the output of the adapter which is designed for this purpose e.g. in a known or routine manner, or corresponding to the requirements of the dental instrument.

If the output as well as the first and second input are designed in the usual manner for the respective type of connection, or in a type compatible with the connections of the parts to be connected, an existing dental treatment unit in particular can be easily retrofitted with a dental instrument to be operated by the compressed air of a compressor without having to undertake additional or more extensive conversion tasks.

The valve can be operated as a switch or in the manner of a relay so that the gas flow through the valve can be turned on and off by means of the control signal. Continuous controllability of the flow can also be achieved by means of a suitable valve and control signal.

The valve can, for example, be operated or switched pneumatically by means of drive air as a control signal. Drive air and, for example, a foot switch for controlling the drive air supply are frequently available in known dental treatment units, for example.

Advantageously, a lamp voltage, and/or spray air, and/or spray water, and/or water can be conveyed to the output by means of the second input.

This makes it possible to retain conventional operating functions of a treatment unit if one wishes to retrofit the treatment unit with a compressor for driving the dental instrument. For this purpose, the additional media can, for example, be provided from a treatment chair by means of a conventional line for this purpose and connected to the correspondingly designed second input of the adapter. Routine connection types or hoses are, for example, specified in the standard ISO 9168. The additional media are then guided through the adapter to the adapter output in order to supply the dental instrument.

The adapter advantageously has a back suction stop. In particular, the additional space available from the adapter makes it possible to provide additional functions and offers the opportunity of easily retrofitting treatment units with these functions. When the water supply of the dental instrument is guided through the adapter, a back suction stop can be arranged in the adapter.

An additional water valve to prevent dripping can also be easily arranged in the adapter.

The adapter advantageously has an exchangeable water filter. The additional space available in the adapter can also be used to clean water by means of a water filter when a water supply is guided through the adapter. In order to satisfy hygiene requirements, the filter is exchangeable. It can easily be arranged to be easily accessible in the adapter.

Advantageously, the second input is a coupling according to ISO 9168. Accordingly, a frequently used hose such as a hose with a 2, 3, 4 or 6-hole connection according to the aforementioned standard can be used for transmitting additional media such as spray air and spray water, water and/or lamp current, or connected directly to the adapter.

Advantageously, the adapter has at least one pressure regulator and/or filter between the first input and the valve. By means of a pressure regulator, adaptation of gas pressure provided by the compressor or air motor to the requirements of the valve and/or the dental instrument can be easily ensured, and damage to the valve and/or the dental instrument from excessive pressure, e.g. including by undesirable pressure peaks, can be avoided. A filter for filtering the compressed gas such as air helps prevent damage to the valve, the turbine to be driven, or the pneumatic motor from impurities in the compressed gas provided by the compressor. A greater tolerance of the compressed air supply by the compressor can be achieved by means of the pressure regulator and/or filter.

Advantageously, the adapter has means for selecting and/or limiting pressure regulator output.

Ease of use of the pressure regulator can be enabled by such means. The output of a pressure regulator provided in the adapter can, for example, be preselected or changed using means such as a knob attached to the outside of the adapter, or a maximum output can be set as a limit value.

The adapter advantageously has a generator. This makes it possible to supply a dental instrument possessing a light source with the corresponding required lamp voltage even when the treatment unit does not have a light supply. The generator can be arranged in the control signal path or in the compressed gas path, also termed the performance path, i.e., between second input and the output, or between the first input and the output. Depending on the version of the arrangement, the lamp voltage can then be generated by means of a drive gas provided as the control signal, or by means of the compressed gas for the dental instrument. The generator makes it possible to easily and economically connect and operate a dental instrument with a light to any available treatment unit.

The generator can, for example, have current and/or voltage conditioning.

Furthermore, the invention relates to a dental treatment unit which has a treatment chair, at least one control unit, at least one dental instrument to be operated by compressed gas, a compressor and an adapter of the aforementioned type, wherein the dental instrument is connected to the adapter output, the compressor is connected to the first input of the adapter, and the control unit is connected to the second input.

Conventional treatment units can provide a pressure of approximately 3 bar and a flow of approximately 52 Nl/min to operate a dental instrument. By adding a compressor to such a treatment unit, a greater pressure and greater flow such as 4 bar and 65 Nl/min can be provided for operating the dental instrument. The adapter guarantees that connections or lines for media of known treatment units can still be used.

BRIEF DESCRIPTION OF THE DRAWINGS

Exemplary embodiments of the invention are depicted in the drawings. In the drawings.

EXEMPLARY EMBODIMENTS

Figure 1:
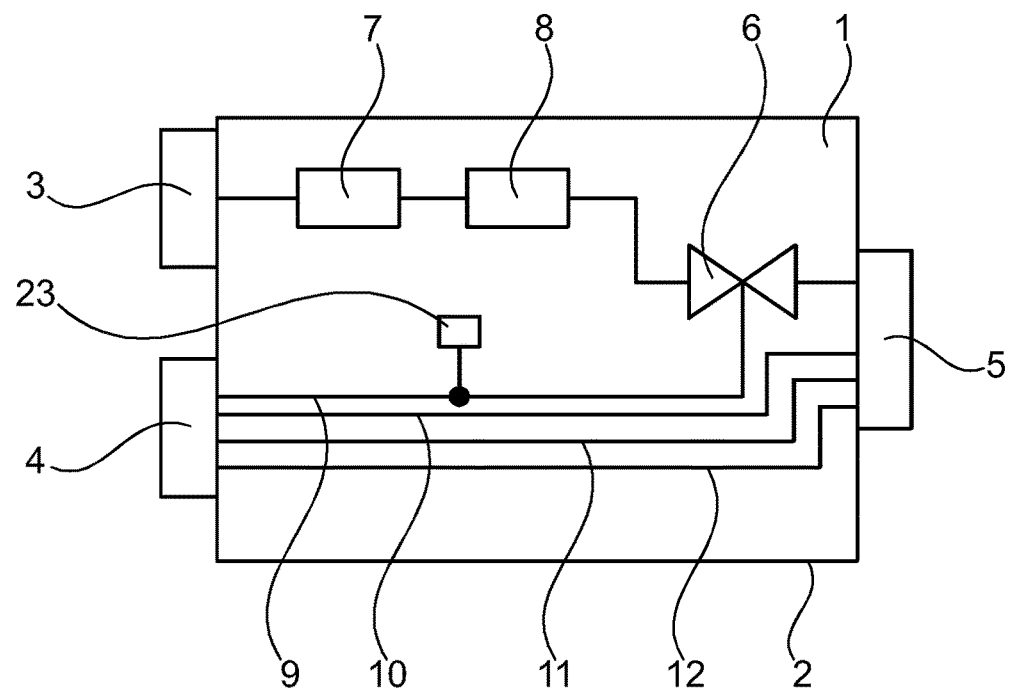
FIG. 1 shows an adapter according to the invention, FIG. 2A, B show additional versions of an adapter according to the invention.

FIG. 1 shows an adapter 1 that has a housing 2 with a first input 3 for compressed gas, a second input 4 for a control signal and possibly other media, and an output 5. Arranged between the first input 3 and output 5 is a valve 6 that can be regulated by a control signal.

In the exemplary embodiment shown in FIG. 1, the adapter 1 also has a filter 7 and a pressure regulator 8 which follows the first input 3 in this sequence and filters compressed gas entering the adapter 1 through the first input 3 and reduces the gas pressure before it enters the valve 6. The filter 7 and/or pressure reducer 8 enable reliable protection of the dental instrument 18. In particular, poorer quality compressors 19 (shown in FIG. 3) can be safely used since contaminants in the compressed gas or pressure peaks are captured or filtered out by the adapter 1.

The second input 4 is designed in the exemplary embodiment in FIG. 1 as a 6-hole turbine connection according to the standard ISO 9168 so that, in addition to the control signal, a lamp voltage, spray water and spray air can also be transmitted. Whereas the control signal is transferred by means of a suitable line 9 to the valve 6, lamp voltage, spray water and spray air are transferred by means of suitable lines 10, 11, 12 to the output 5.

Drive air can, for example, be used as the control signal. The opening of the valve in this case can, for example, be triggered by the actuation of a foot switch (not shown). The pressure of the air in the line 9 increases, and the valve opens. The closing of the valve is accomplished, for example, by releasing the foot switch. As shown in FIG. 1, it is advantageous in this case to equip the line 9 transferring the drive air from the second input 4 to the valve 6 with ventilation 23 to accelerate the desired pressure drop and hence the switching process. However, the ventilation 23 may be annoyingly perceptible when the pressure drops in the line. Furthermore, annoying noise can arise from the ventilation 23. To prevent this, the ventilation 23 can be equipped with a silencer.

Figure 2A:
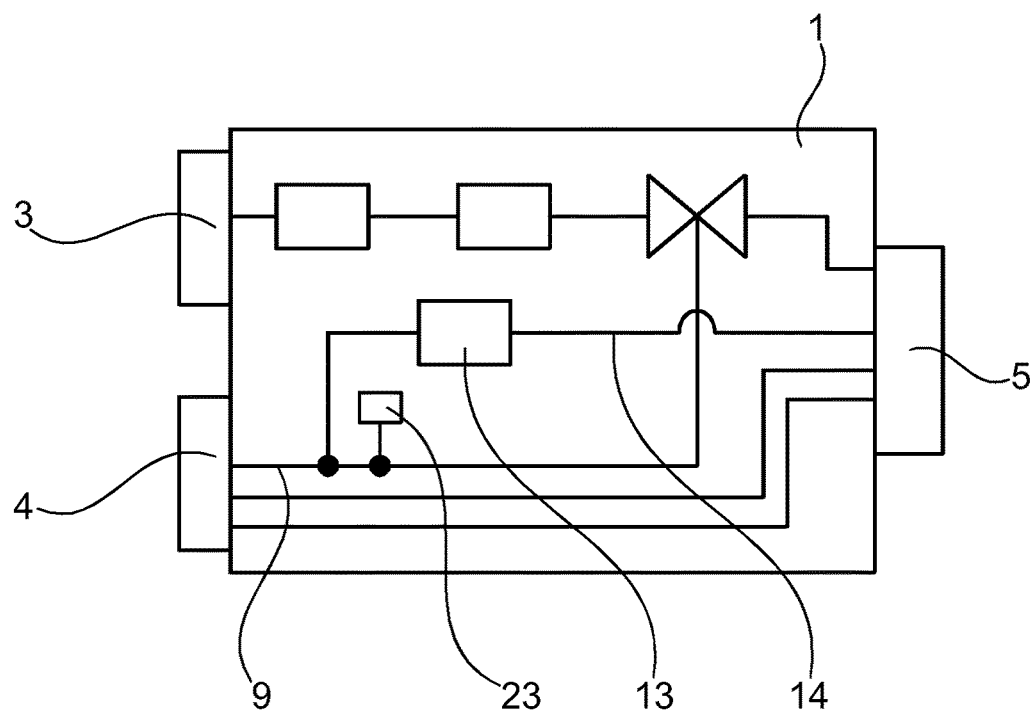
Figure 2B:
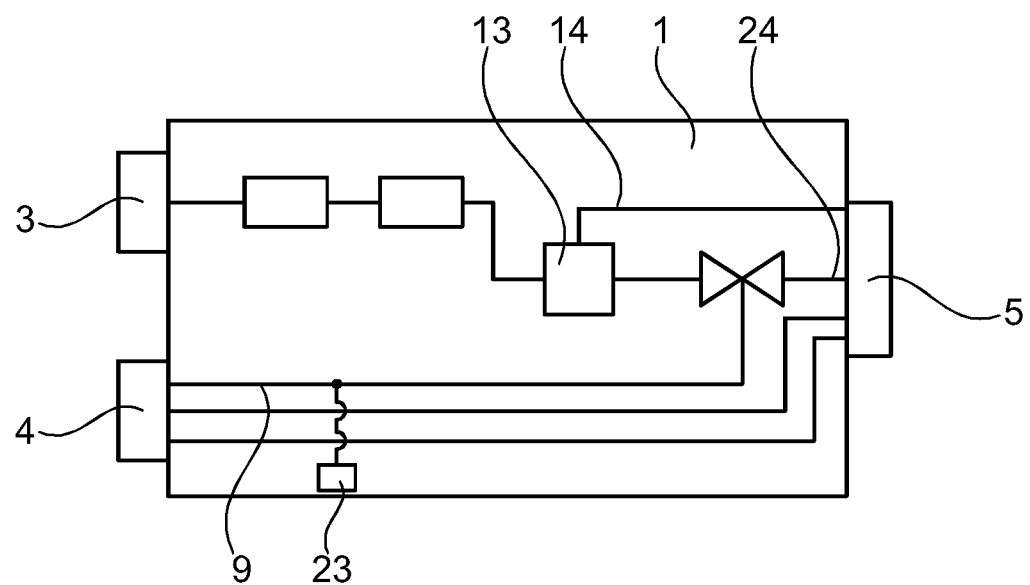

FIGS. 2A and 2B show additional exemplary embodiments of an adapter 1. Instead of a line 10 for a lamp voltage running from the second input 4 to the output 5, the adapter 1 in FIG. 2A has a generator 13 for generating the lamp voltage. The generator 13 such as a turbine is controlled or operated by means of the control signal such as drive air, and the generated voltage is transmitted to the output 5 by a suitable line 14.

Figure 3:
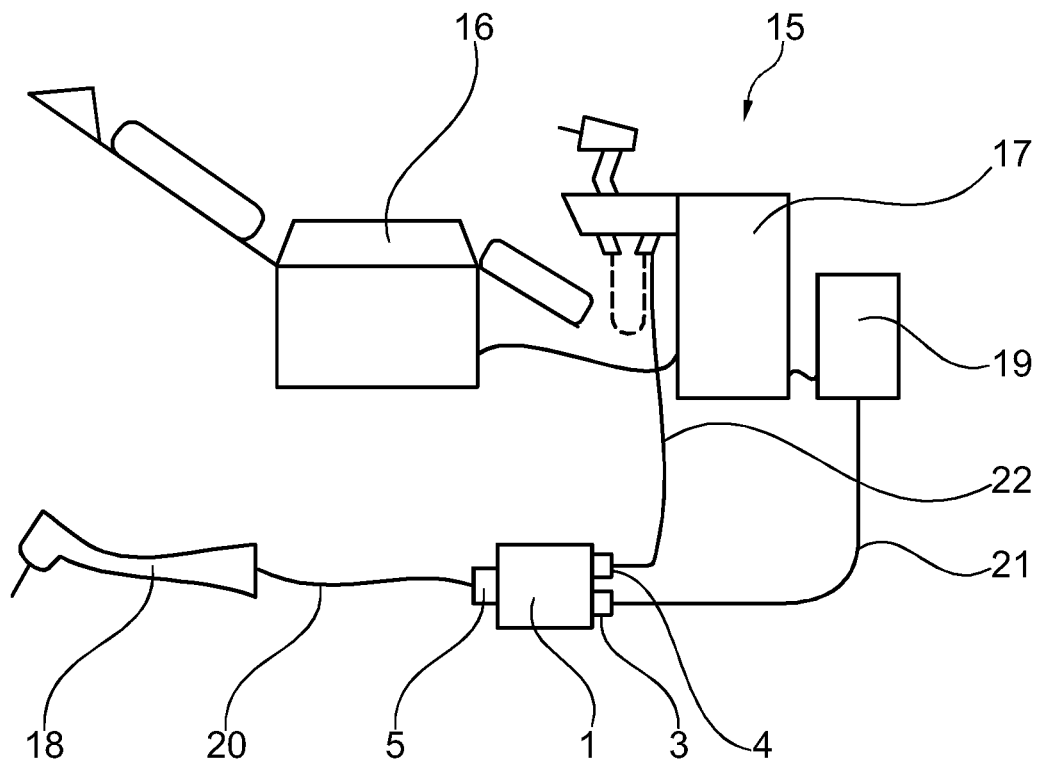
FIG. 3 shows a treatment unit according to the invention.

In the exemplary embodiment in FIG. 2B, the generator 13 for generating the lamp voltage is arranged between the first input 3 for the compressed gas, and the valve 6 and is correspondingly operated by the compressed gas from the compressor 19 (shown in FIG. 3). It would also be possible to arrange the generator 13 between the valve 6 and the output 5.

In FIG. 3, a treatment unit 15 according to the invention is sketched which has a treatment chair 16, a control unit 17, a dental instrument 18 to be operated with compressed gas, a compressor 19 and an adapter 1. The instrument 18—which can be a dental turbine or a pneumatic motor, such as one in combination with a handpiece or a contra-angle handpiece—is connected by means of a suitable media line 20 to the output 5 of the adapter 1 and is supplied with compressed air through the media line 20. If required by the instrument 18, the instrument can also be supplied through the media line 20 with spray water and spray air, with water and/or with a lamp voltage or other desired media. Such media lines are known and conform to the requirements of the dental instrument 18 to be connected. The compressor 19 is connected to the first input 3 of the adapter 1 by means of a suitable line 21. Through a suitable line 22, such as a standardized 6-hole connection hose according to ISO 9168, the control line 17 supplies the control signal such as drive air for a pneumatically operated valve 6, as well as possibly spray water, spray air, water and/or lamp voltage to the second input 4 of the adapter 1.

LIST OF REFERENCE NUMBERS

1 Adapter
2 Housing
3 First input
4 Second input
5 Output
6 Valve
7 Filter
8 Pressure regulator
9 Line
10 Line
11 Line
12 Line
13 Generator
14 Cable
15 Treatment unit
16 Treatment chair
17 Control unit
18 Dental instrument
19 Compressor
20 Media line
21 Line
22 Line
23 Ventilation

The invention claimed is:

1. An adapter for connecting a dental instrument to a compressor and to a control unit, comprising:
 a first input for compressed gas of a compressor;
 a second input for a control signal from a control unit;
 an output for connecting to a dental instrument;
 a compressed gas path formed between the first input and the output;
 a control signal path formed between the second input and the output;
 a valve arranged in the compressed gas path that is controllable by the control signal; and
 a generator arranged in the compressed gas path or in the control signal path, said generator configured to be controlled by the control signal to generate a voltage for transmission to the output, and
 wherein the control signal is drive air or drive gas.

2. The adapter according to claim 1, wherein the second input is configured to convey a lamp voltage, spray air, spray water, and/or water to the output.

3. The adapter according to claim 1, wherein the second input is a coupling according to ISO 9168.

4. The adapter according to claim 1, further comprising: a pressure regulator and a filter which are disposed between the first input and the valve.

5. The adapter according to claim 4, further comprising: a unit configured to select and/or limit an output of the dental instrument by adjusting the pressure regulator.

6. The adapter according to claim 1, wherein the generator is a turbine.

7. The adapter according to claim 1, wherein the generator has current and/or voltage conditioning.

8. A dental treatment unit, comprising:
 a control unit;
 a dental instrument constructed to operate by compressed gas;
 a treatment chair;
 a compressor; and
 an adapter that includes:
  a first input connected to the compressor for receiving compressed gas from the compressor,
  a second input connected to the control unit for receiving a control signal from the control unit,
  an output connected to the dental instrument,
  a compressed gas path formed between the first input and the output;
  a control signal path formed between the second input and the output;
  a valve arranged in the compressed gas path that is controllable by the control signal; and
  a generator arranged in the compressed gas path or in the control signal path, said generator configured to be controlled by the control signal to generate a voltage for transmission to the output, and
 wherein the control signal is drive air or drive gas.

9. The dental treatment unit according to claim 8, wherein the second input is configured to convey a lamp voltage, spray air, spray water, and/or water to the output.

10. The dental treatment unit according to claim 8, wherein the second input is a coupling according to ISO 9168.

11. The dental treatment unit according to claim 8, wherein the adapter further includes a pressure regulator and a filter which are disposed between the first input and the valve.

12. The dental treatment unit according to claim 11, wherein the adapter further includes a unit configured to select and/or limit an output of the dental instrument by adjusting the pressure regulator.

13. The dental treatment unit according to claim 8, wherein the generator is a turbine.

14. The dental treatment unit according to claim 8, wherein the generator has current and/or voltage conditioning.

* * * * *